United States Patent
Naito et al.

(10) Patent No.: US 7,287,566 B2
(45) Date of Patent: Oct. 30, 2007

(54) TIRE/WHEEL ASSEMBLY AND RUN-FLAT SUPPORT MEMBER

(75) Inventors: Mitsuru Naito, Hiratsuka (JP); Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 57 days.

(21) Appl. No.: 10/541,843

(22) PCT Filed: Feb. 19, 2004

(86) PCT No.: PCT/JP2004/001913

§ 371 (c)(1),
(2), (4) Date: Jul. 12, 2005

(87) PCT Pub. No.: WO2004/074015

PCT Pub. Date: Sep. 2, 2004

(65) Prior Publication Data

US 2006/0113018 A1    Jun. 1, 2006

(30) Foreign Application Priority Data

Feb. 21, 2003  (JP) ............................. 2003-043892
Feb. 21, 2003  (JP) ............................. 2003-043900

(51) Int. Cl.
*B60C 17/00*  (2006.01)
*B60C 17/04*  (2006.01)
*B60C 5/00*   (2006.01)

(52) U.S. Cl. ...................... 152/516; 152/152; 152/155; 152/520

(58) Field of Classification Search ................ 152/152, 152/516, 520
See application file for complete search history.

(56) References Cited

U.S. PATENT DOCUMENTS

| | | | | |
|---|---|---|---|---|
| 4,121,640 A | * | 10/1978 | Henning et al. | 152/340.1 |
| 4,674,549 A | * | 6/1987 | Bush | 152/158 |
| 5,435,363 A | * | 7/1995 | Pender | 152/158 |
| 6,463,976 B1 | * | 10/2002 | Glinz et al. | 152/520 |

FOREIGN PATENT DOCUMENTS

| | | |
|---|---|---|
| JP | 56-146409 A | 11/1981 |
| JP | 2001-519279 A | 10/2001 |
| JP | 2002-120509 A | 4/2002 |
| JP | 2002-234304 A | 8/2002 |
| JP | 2003-226104 A | 8/2003 |
| JP | 2004-034904 A | 2/2004 |

* cited by examiner

*Primary Examiner*—Justin R. Fischer
(74) *Attorney, Agent, or Firm*—Greer, Burns & Crain, Ltd

(57) ABSTRACT

A tire/wheel assembly comprising a wheel having a rim, a pneumatic tire mounted on the rim of the wheel and a run-flat support member disposed in the cavity of the pneumatic tire. The run-flat support member includes an annular shell and elastic rings. The annular shell has a support surface located radially outward and two leg portions formed radially inward in a straddling state. The elastic rings support the leg portions on the rim. The annular shell is configured such that an annular cavity portion surrounded by the run-flat support member and the pneumatic tire has a cross-sectional area that varies in the circumferential direction of the tire.

9 Claims, 3 Drawing Sheets

TIRE/WHEEL ASSEMBLY AND RUN-FLAT SUPPORT MEMBER

TECHNICAL FIELD

The present invention relates to tire/wheel assemblies and run-flat support members, and more particularly, to a tire/wheel assembly and a run-flat support member used therefor, in which noise characteristics can be improved.

TECHNICAL BACKGROUND

In response to demands in the market, there have been proposed many technologies which allow a vehicle to urgently travel several hundreds kilometers when a pneumatic tire thereof is punctured during traveling. These many proposals include such a technology disclosed in, for example, Unexamined Japanese Patent Application Publication No. 10-297226 that a support member is mounted on a rim in the cavity of a pneumatic tire assembled on the rim, and supports the tire when punctured to thereby enable run-flat traveling.

The above run-flat support member comprises an annular shell having a support surface located radially outward and a leg structure in an open state disposed radially inward, and elastic rings attached to two leg portions of the leg structure, and is supported on the rim via the elastic rings. The run-flat support member allows existing wheels and rims to be used without any specific modifications, and can therefore be advantageously adopted without causing confusions in the market.

Recently, as part of environmental measures, low noise pneumatic tires has been required. Pneumatic tires cause resonance of the air in the cavity of the pneumatic tire during traveling, which is one of the causes that increase road noise.

Conventionally, to solve the above problem, in common tire/wheel assemblies having a wheel and a pneumatic tire mounted on the rim thereof, for example, Unexamined Japanese Patent Application Publication No. 2001-113902 discloses such a technology that protrusions are disposed on the rim at predetermined intervals in the tire circumferential direction to vary the cross-sectional area of the cavity surrounded by the rim and pneumatic tire in the tire circumferential direction, thereby varying the frequency of the air resonance to reduce road noise due to the air resonance.

However, there have not been proposed any effective noise reduction measures with respect to the tire/wheel assembly having the above-mentioned ran-flat support member, and proposals for improvement technologies are desired.

DISCLOSURE OF THE INVENTION

An object of the present invention is to provide a tire/wheel assembly and a run-flat support member used therefor, in which road noise of the tire/wheel assembly having the run-flat support member, due to resonance of the air in the cavity of the pneumatic tire can be reduced.

In order to achieve the above object, a tire/wheel assembly according to the present invention comprises:
a wheel having a rim;
a pneumatic tire mounted on the rim of the wheel, the pneumatic tire having a cavity; and
a run-flat support member disposed in the cavity of the pneumatic tire, the run-flat support member having an annular shell and elastic rings, the annular shell comprising a support surface located radially outward and two leg portions formed radially inward in a straddling state, the elastic rings supporting the leg portions on the rim,
wherein the annular shell is configured such that an annular cavity portion surrounded by the run-flat support member and the pneumatic tire has a cross-sectional area that varies in a circumferential direction of the tire.

A run-flat support member used for the above tire/wheel assembly of the present invention, which is to be disposed in a cavity of a pneumatic tire mounted on a rim of a wheel, comprises:
an annular shell having a support surface located radially outward and two leg portions formed radially inward in a straddling state; and
elastic rings supporting the leg portions on the rim,
wherein the annular shell is configured such that, when the run-flat support member is disposed in the tire cavity, an annular cavity portion surrounded by the run-flat support member and the pneumatic tire has a cross-sectional area that varies in a circumferential direction of the tire.

As described above, the cross-sectional area of the annular cavity portion surrounded by the run-flat support member and pneumatic tire varies in the tire circumferential direction, thereby allowing the frequency of air resonance caused in the cavity of the pneumatic tire to vary during traveling of a vehicle. Therefore, road noise due to resonance of the air in the cavity can be improved.

Another tire/wheel assembly according to the present invention comprises:
a wheel having a rim;
a pneumatic tire mounted on the rim of the wheel, the pneumatic tire having a cavity; and
a run-flat support member disposed in the cavity of the pneumatic tire in such a manner that the run-flat support member divides the cavity of the pneumatic tire into an inner cavity part and an outer cavity part, the run-flat support member having an annular shell and elastic rings, the annular shell comprising a support surface located radially outward and two leg portions formed radially inward in a straddling state, the elastic rings supporting the leg portions on the rim,
wherein the annular shell has a plurality of openings through which the inner cavity part and outer cavity part are communicatingly connected, the annular shell having regions equally sectioned in a circumferential direction of the annular shell, the plurality of openings being unevenly distributed in such a manner that a region having openings that are maximum in total opening area is 5% to 10% greater in total opening area than a region having openings that are minimum in total opening area.

Another run-flat support member used for another tire/wheel assembly of the present invention comprises:
an annular shell having a support surface located radially outward and two leg portions formed radially inward in a straddling state; and
elastic rings supporting the leg portions on a rim of a wheel,
wherein the annular shell has a plurality of openings, the annular shell having regions equally sectioned in a circumferential direction of the annular shell, the plurality of openings being unevenly distributed in such a manner that a region having openings that are maximum in total opening area is 5% to 10% greater in total opening area than a region having openings that are minimum in total opening area.

As described above, the uneven distribution of the openings in the equally sectioned regions allows the openings and inner cavity part to act as a Helmholm resonance absorber, thereby absorbing and reducing resonance of the air in the tire cavity during traveling of a vehicle. Accordingly, road noise due to resonance of the air in the cavity of the pneumatic tire can be reduced.

When the pneumatic tire is assembled on the rim, the bead portions of the pneumatic tire with the run-flat support member inserted in the cavity thereof are engaged with the rim, and air is then applied to inflate the pneumatic tire, whereby the bead portions are forced to climb over the humps of the rim to be fitted to the flanges of the rim. According to the present invention, the pneumatic tire can be easily inflated by air supplied through the openings to the outer cavity part between the run-flat support member and the inner surface of the pneumatic tire, thereby allowing the bead portions of the tire to climb over the humps and to be easily fitted to the rim flanges.

BRIEF DESCRIPTION OF THE DRAWINGS

FIGS. 3A and 3B illustrate a tire/wheel assembly according to an alternative embodiment of the present invention, in which FIG. 3A is an enlarged cross-sectional view corresponding to FIG. 2A, and FIG. 3B is an enlarged cross-sectional view corresponding to FIG. 2B.

BEST MODES FOR CARRYING OUT THE INVENTION

Figure 1:
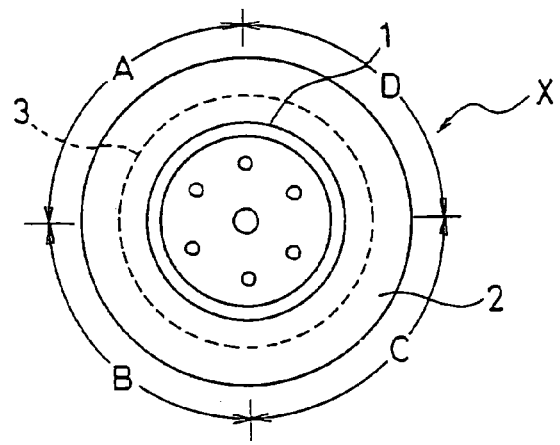
FIG. 1 is a side view showing a tire/wheel assembly according to an embodiment of the present invention.

According to the present invention, the run-flat support member is formed as an annular member to be inserted into the cavity of a pneumatic tire. This run-flat member is formed to have an outer diameter smaller than the inner diameter of the cavity of a pneumatic tire so as to maintain a constant distance from the inner surface of the cavity, and is formed to have an inner diameter which is substantially equal in size to the inner diameter of the bead portions of a pneumatic tire. The run-flat support member is inserted into a pneumatic tire, and mounted on the rim of a wheel together with the pneumatic tire to form a tire/wheel assembly. The tire/wheel assembly is mounted on a vehicle, and when the pneumatic tire is punctured during traveling, the punctured tire is supported by the radially outer surface of the run-flat support member to thereby allow for run-flat traveling.

The above-mentioned run-flat support member includes an annular sell and elastic rings as main parts.

The annular shell has a continuous support surface formed radially outward for supporting a punctured tire, and left and right sidewalls as two leg portions in a straddling shape disposed radially inward. The radially outward support surface is formed so as to have radially outwardly convexed and curved surface sections in a cross-sectional shape taken along a plane orthogonal to the circumferential direction thereof. The number of the convexly curved surface sections which are arranged in an axial direction of the tire may be one, but preferably, two or more. Formation of the support surface in such a way as to arrange two or more convexly curved surface sections provides the support surface with two or more dispersed contact areas with respect to the inner surface of the tire to thereby reduce localized wear on the tire inner surface, and therefore, the run-flat traveling distance can be extended.

The elastic rings are attached to the ends of the two leg portions formed in a straddling state on the radially inner side of the annular shell, respectively, and come into engagement with left and right rim seats to thereby support the annular shell. The elastic rings are formed of rubber or elastic resin, and not only mitigate the vibration and impact of the annular shell receiving from the punctured tire, but also prevent slipping with respect to the rim seats to stably support the annular shell.

The annular shell is formed of a rigid material since the run-flat support member has to support a vehicle weight through the punctured tire. Constituent materials used for the rigid material include metals, resins and the like. The metals may include, for example, steel and aluminum. The resins may include thermoplastic resins and thermosetting resins. The thermoplastic resins may include nylon, polyester, polyethylene, polypropylene, polystyrene, polyphenylene sulfide, ABS and the like, and the thermosetting resins may include epoxy resin, unsaturated polyester resin, etc. The resins may be used alone or mixed with reinforcing fibers as fiber-reinforced resins.

The rubber or elastic resin used to constitute the elastic rings may be any kind of rubber or elastic rein if the annular shell can stably be supported. The rubber may be, for example, natural rubber, isoprene rubber, styrene-butadiene rubber, butadiene rubber, or butyl rubber, and the elastic resin may be, for example, resin foam such as foamed polyurethane.

The run-flat support member used for the tire/wheel assembly of the present invention is premised on the structure described above.

Embodiments of the present invention will be described in detail below with reference to the drawings.

Referring to FIGS. 1 and 2, there is shown a tire/wheel assembly according to an embodiment of the present invention, in which reference character X denotes a tire/wheel assembly, reference numeral 1 denotes a wheel, reference numeral 2 denotes a pneumatic tire, and reference numeral 3 denotes a run-flat support member. The wheel 1, pneumatic tire 2, and run-flat support member 3 are arranged in coaxial alignment with each other with respect to the axis of rotation of the wheel to be in the form of an annulus, which has an arrangement such that the run-flat support member 3 is placed in the cavity 2A of the pneumatic tire 2 mounted on the rim 1A of the wheel 1.

The run-flat support member 3 comprises an annular shell 4 formed of a rigid material such as metal or rein, and left and right elastic rings 5 formed of an elastic material such as rubber or elastic resin.

The annular shell 4 includes a support portion 6 comprising two support sections 6A each of which has a convexly curved support surface 6a formed radially outward, and a connection section 6B connecting the two support sections in the widthwise direction of the shell. The support surfaces 6a are spaced apart from the inner surface 2a of the pneumatic tire 2 when the pneumatic tire 2 is under a normal condition, and when punctured, the support surfaces 6a support the punctured tire. The annular shell 4 also includes two side walls which are connected to the support portion 6 and are formed as leg portions 7 that straddle radally inward, and the elastic rings 5 are attached to the radially inner sides of the leg portions 7.

Figure 2A:
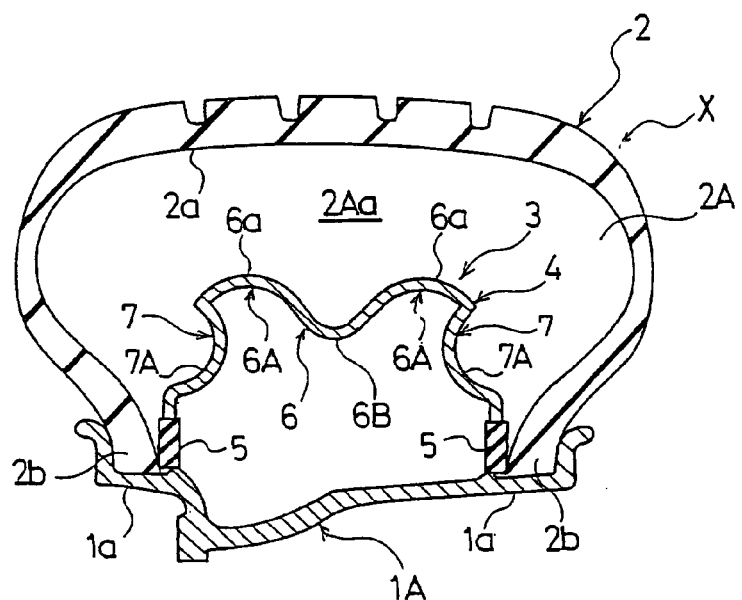
FIG. 2A is an enlarged cross-sectional view showing a part in the region A, C in FIG. 1, taken in a plane that contains the axis of rotation of the tire.
Figure 2B:
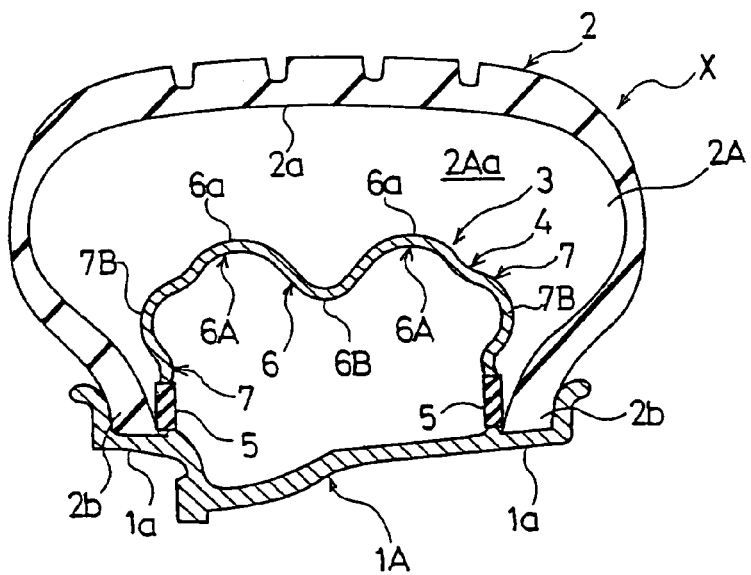
FIG. 2B is an enlarged cross-sectional view showing apart in the region B, D in FIG. 1, taken in a plane that contains the axis of rotation of the tire.

The two leg portions 7 have four regions A, B, C and D equally sectioned in the circumferential direction of the shell. In each of the regions A and C opposite to each other, the two leg portions include cross-sectionally arc-shaped depressions 7A which are depressed inwardly and extend circumferentially, as shown in FIG. 2A, and in each of the regions B and D opposite to each other, the two leg portions include cross-sectionally arc-shaped protrusions 7B which protrude outwardly and extend circumferentially, as shown in FIG. 2B. Thus the cross-sectional shape of each leg portion 7 varies periodically in the tire circumferential direction, whereby the cross-sectional area of an annular cavity portion 2Aa surrounded by the run-flat support member 3 and pneumatic tire 2 varies periodically in regular periods in the tire circumferential direction.

The annular shell 4 having leg portions 7 described above can easily be obtained by forming shell pieces divided according to the respective regions, and jointing the shell pieces by welding or the like.

The run-flat support member 3 having the annular shell 4 constructed as described above is inserted inside the pneumatic tire 2, and the elastic rings 5 are mounted on the rim seats 1a of the rim 1A together with the bead portions 2b of the pneumatic tire 2.

According to the tire/wheel assembly X of the present invention mentioned above, the cross-sectional area of the annular cavity portion 2Aa surrounded by the run-flat support member 3 and pneumatic tire 2 varies in the tire circumferential direction, thereby allowing the frequency of air resonance caused in the cavity 2A to vary during traveling of a vehicle. Accordingly, road noise due to resonance of the air in the cavity 2A can be reduced.

Figure 3A:
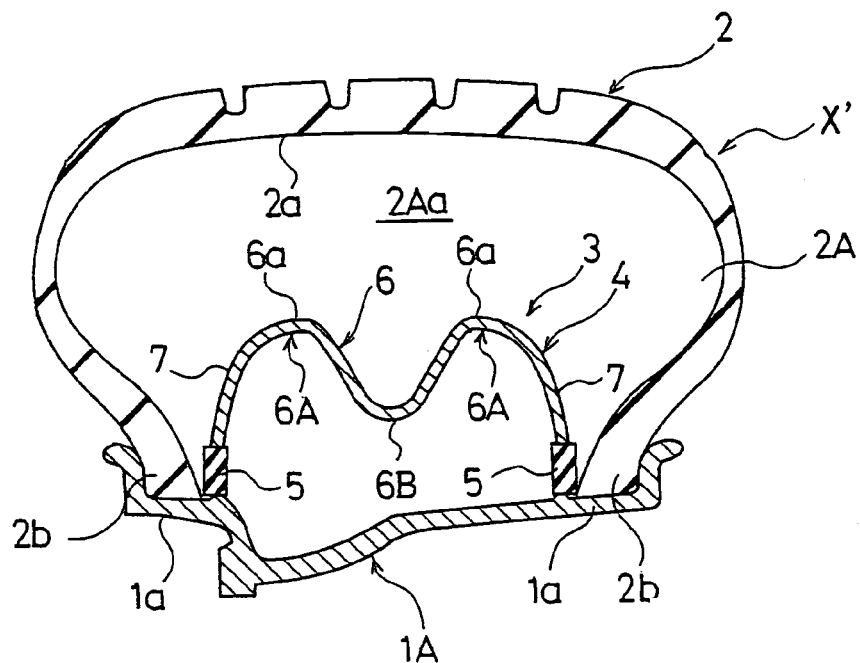
Figure 3B:
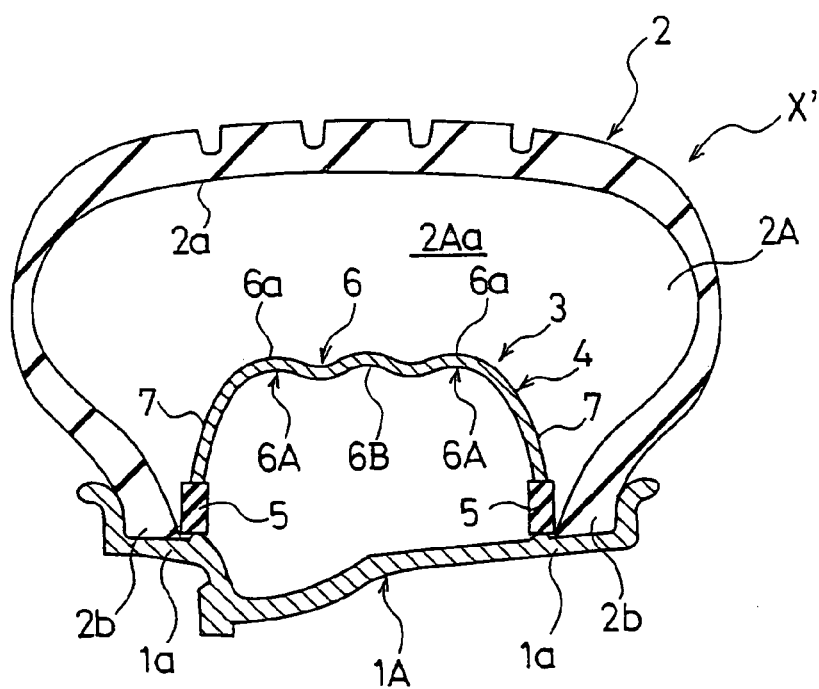

Referring to FIGS. 3A and 3B, there is shown an alternative embodiment of a tire/wheel assembly according to the present invention. This tire/wheel assembly X' has the following structure in the above-mentioned tire/wheel assembly X, instead of providing the leg portions 7 with the depressions 7A and protrusions 7B. The connection section 6B connecting the support surfaces 6a is formed to have circularly curved depressions which are depressed deeply inwardly in the regions A and B as shown in FIG. 3A, and is formed to have circularly curved protrusions which protrude outwardly in the regions B and D as shown in FIG. 3B, whereby the cross-sectional shape of the connection section 6B varies periodically in the tire circumferential direction.

This also causes the cross-sectional area of the annular cavity portion 2Aa surrounded by the run-flat support member 3 and pneumatic tire 2 to vary in the tire circumferential direction, whereby the same effect mentioned above can be obtained.

In the embodiments of the present invention set forth hereinabove, when the cross-sectional area of the cavity portion 2Aa varies as stated supra, it is preferable that the cross-sectional area of the cavity portion 2Aa vary such that the maximum cross-sectional area thereof is 2% greater or more than the minimum cross-sectional area thereof. In the embodiments shown in the drawings, the maximum cross-sectional area exists in each of the regions A and C, and the minimum cross-sectional area exists in each of the regions B and D. The cross-sectional area of the cavity portion 2Aa in each of the regions A and C is 2% greater or more than the cross-sectional area thereof in each of the regions B and D. If the difference therebetween is less than 2%, it is difficult to effectively vary air resonance frequency. It is more preferable that the difference be 5% greater or more. The upper limit of the difference is preferably 20% or less in terms of workability of the annular shell 4.

It is preferable that the forgoing annular shell 4 be formed by forming shell pieces divided in the shell circumferential direction according to the respective regions, and jointing the shell pieces by welding or the like to easily produce the annular shell, as described above, but it is not limited thereto as is obvious. The annular shell 4 may be, for example, integrally formed.

In case where the annular shell 4 is formed by jointing the shell pieces as mentioned above, there exist steps in the joint parts having depression and protrusion portions, whereby the annular shell 4 have joint gaps through which the outside and inside of the annular shell 4 are in communication with each other. The joint gaps may be left as they are, or may be closed using other materials. Preferably, the joint gaps are closed, thereby contributing to slightly decreasing road noise.

The annular shell 4 may be constructed such that the shell pieces are formed to have no depressions or protrusions at opposing end thereof, and are jointed without making steps.

In the above embodiments, there are exemplified the annular shell 4 in which only the cross-sectional shapes of the leg portions 7 vary, or the annular shell 4 in which only the cross-sectional shape of the connection section 6B varies. However, the annular shell 4 may have a combination of these features. For example, the annular shell 4 may be constructed so as to have a cross-sectional shape shown in FIG. 3A in the region A, a cross-sectional shape shown in FIG. 3B in the region B, a cross-sectional shape shown in FIG. 2A in the region C, and a cross-sectional shape shown in FIG. 2B in the region D.

The annular shell 4 may also be constructed such that the leg portions 7 and connection section 6B are provided with the depressions and protrusions stated supra, whereby the cross-sectional area of the cavity portion 2Aa surrounded by the annular shell 4 and pneumatic tire 2 varies in the tire circumferential direction.

In the embodiment shown in FIGS. 2A and 2B, the two leg portions 7 are provided with the depressions 7A and protrusions 7B. However, either of the two leg portions 7 may be provided therewith, and the annular shell 4 may have a combination thereof.

It is preferable in terms of effectiveness that the cross-sectional area of the cavity portion 2Aa varies periodically as described above. However, it is not limited thereto, and the cross-sectional area of the cavity portion 2Aa may randomly vary in irregular periods.

When the cross-sectional area of the cavity portion 2Aa varies periodically, it is preferable to have two periods. In this case, as shown in the above embodiments of FIGS. 2 and 3, the annular shell is preferably configured to vary in two periods in the order of the maximum cross-sectional area region, minimum cross-sectional region, maximum cross-sectional area region and minimum cross-sectional area region.

The depressions 7A and protrusions 7B of the leg portions 7 are preferably in the forms of circular arcs in cross section as described above in terms of supporting load during run-flat traveling, but if there are no obstacles to run-flat traveling, any of shapes may be employed. The same goes for the connection section 6B shown in FIGS. 3A and 3B.

Figure 4:
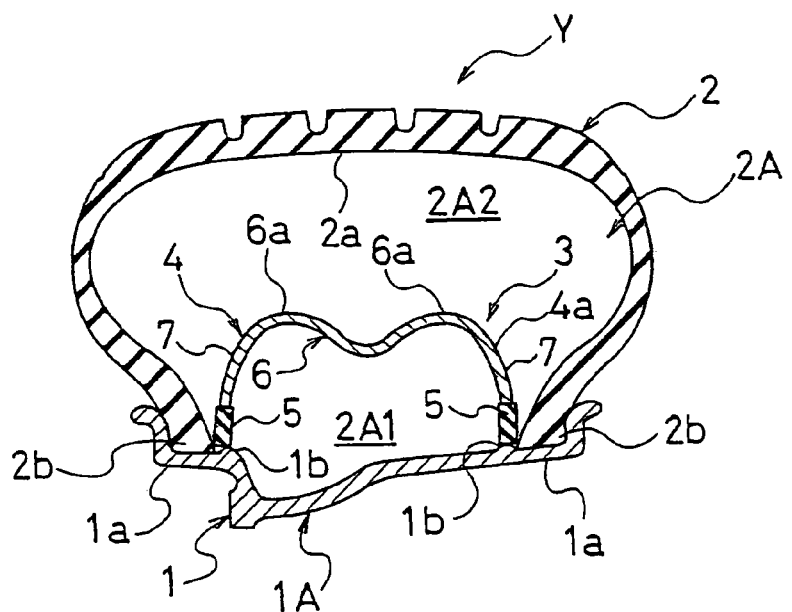
FIG. 4 is an enlarged cross-sectional view showing a main part of a tire/wheel assembly according to another alternative embodiment of the present invention, taken in a plane that contains the axis of rotation of the tire.
Figure 5:
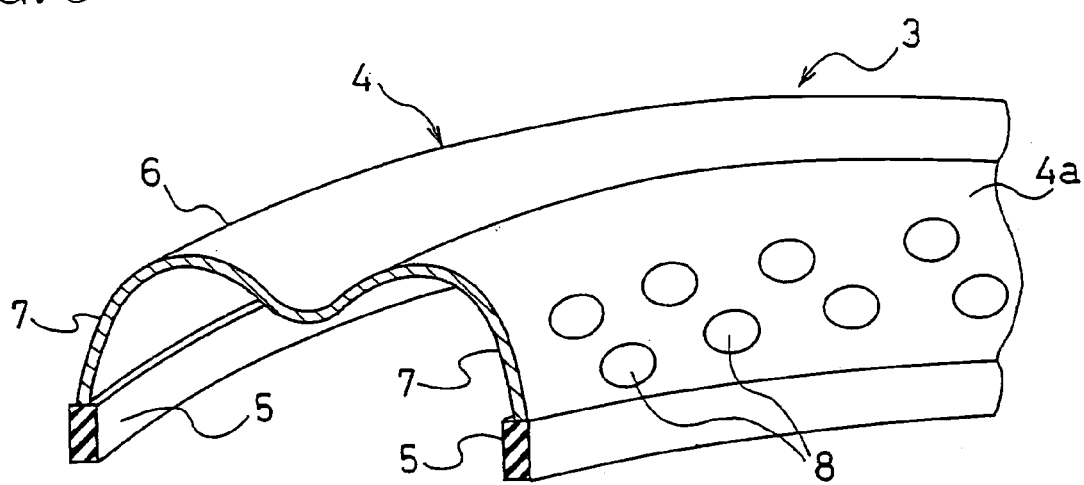
FIG. 5 is a partial enlarged fragmentary perspective view showing a main part of the run-flat support member in FIG. 4.

Referring to FIG. 4, there is shown another alternative embodiment of a tire/wheel assembly according to the present invention. This tire/wheel assembly Y is constructed such that the annular shell 4 has no depressions or protrusions but a plurality of openings 8 formed in the two leg portions 7 as shown in FIG. 5. The hermetically-closed inner cavity part 2A1 and hermetically-closed outer cavity part 2A2 of the cavity 2A defined by the run-flat support member 3 placed in the cavity 2A of the pneumatic tire 2 are communicatingly connected through the openings 8.

In the embodiment shown in the drawings, the annular shell 4 has four regions A, B, C and D equally sectioned in the circumferential direction thereof. The total opening area, on the outer surface 4a of the annular shell 4, of openings 8 in each of the regions A and C is maximized, and the total opening area of openings 8 in each of the regions B and D is minimized. The maximum opening area regions A and C and the minimum opening area regions B and D are alternately placed, and the plurality of openings 8 are unevenly distributed such that the regions have openings 8 that are different in total opening area. The regions A and C having the maximum total opening area of openings 8 are 5% to 10% greater in total opening area than the regions B and D having the minimum total opening area of openings 8.

According to the tire/wheel assembly Y, the uneven distribution of the openings 8 in the equally sectioned regions A, B, C, and D allows the openings 8 and inner cavity part 2A1 to act as a Helmholm resonance absorber, thereby absorbing and reducing resonance of the air in the tire cavity 2A during traveling of a vehicle. Accordingly, road noise due to resonance of the air in the cavity 2A of the pneumatic tire 2 can be improved.

When the pneumatic tire 2 is mounted on the rim, the pneumatic tire 2 can be easily inflated by air supplied to the outer cavity part 2A2 of the pneumatic tire 2 through the openings 8, thereby allowing the bead portions 2B of the tire to climb over humps 1b and to be easily fitted to the rim 1A. Accordingly, workability of assembling the tire on the rim can be improved.

If the difference between the total opening area of openings 8 in the maximum total opening area region A, C and the total opening area of openings 8 in the minimum total opening area region B, D is less than 5%, it is difficult to provide an effectively absorbing function. If the difference is more than 10%, the mass of the run-flat support member 3 varies noticeably around the circumference thereof, whereby vibration is apt to occur to thereby badly affect ride comfort.

It is preferable, in terms of obtaining the highest noise reduction effect, that the uneven distribution of the openings 8 be arranged such that the regions A and C having the maximum total opening area and the regions B and D having the minimum total opening area are alternately placed, as described above, to have two periods, but it is not limited thereto. The annular shell 4 may be arranged such that the annular shell 4 has two to seven regions equally sectioned in the circumferential direction thereof and a region having openings 8 that are maximum in total opening area is 5% to 10% greater in total opening area than a region having openings 8 that are minimum in total opening area. If the annular shell has eight or more equally sectioned regions, it is not preferable because the distribution of the openings 8 is closer to an even distribution.

The openings 8 are elliptical in shape in the drawing shown, but are not limited thereto. The openings 8 may be of any shape such as circle, rectangle, square or the like if the openings can communicatingly connect the inner cavity part 2A1 and the outer cavity part 2A2.

The opening length of each opening 8 is preferably in the range of 3 mm to 6 mm. The opening length referred herein is as follows. In the case of an ellipse, a major axis and a minor axis are the opening lengths; in the case of a circle, a diameter is the opening length; in the case of a rectangle, square, etc, the length of a diagonal line passing through the center thereof is the opening length. If the opening length is less than 3 mm, it is difficult to provide an effectively absorbing function. If the opening length is more than 6 mm, it is not preferable in terms of the strength of the annular shell 4.

The entire opening area of all the openings 8 on the outer surface 4a of the annular shell 4 is preferably in the range of 0.3% to 6.0% with respect to the entire area of the outer surface 4a of the annular shell 4. If the entire opening area is less than 0.3%, it is not preferable in terms of an absorbing effect. If the entire opening area is more than 6.0%, there is a risk of interfering with run-flat traveling because the strength of the annular shell 4 decreases.

In an annular shell 4 having the above-mentioned openings 8 which are unevenly disposed, the equally sectioned regions are determined as regions sectioned at a position where there exists one region that is the largest in the total opening area of the openings 8a when lines by which the regions are equally sectioned are displaced from 0 to 360 degrees in the circumferential direction of the annular shell.

In the above embodiments, the present invention exemplifies the annular shell 4 having two support surfaces 6a. However, the number of the support surfaces 6a is not limited to two, but may be one or a plural number which is more than one.

EXAMPLE 1

Prepared were tire/wheel assemblies according to the present invention tire/wheel assemblies 1 and 2 (present invention assemblies 1 and 2) and conventional tire/wheel assembly 1 (conventional assembly 1), having a tire of size 205/55R16 and a rim of size 15×6 1/2JJ, the present invention tire/wheel assembly 1 having a construction shown in FIGS. 2A and 2B in which the leg portions of the annular shell had depressions and protrusions, the present invention tire/wheel assembly 2 having a construction shown in FIGS. 3A and 3B in which the connection section of the support portion of the annular shell had depressions and protrusions, the conventional tire/wheel assembly 1 having the same construction as the present invention tire/wheel assembly 1 except that the leg portions of the annular shell had no depressions or protrusions.

In the present invention tire/wheel assemblies 1 and 2, the maximum cross-sectional area of the cavity portion is 4% greater than the minimum cross-sectional area thereof.

The test tire/wheel assemblies were mounted on a passenger car of 2.5 liter displacement with the air pressure thereof being 200 kPa, and evaluation testing for road noise was conducted according to the following method. The results shown in Table 1 were obtained.

Road Noise

In a dry road test course, noise was measured in the car when the car was run straight at a speed of 50 km/h. The partial overall values in a frequency range of 100 Hz to 500 Hz were used to compare with each other. The results were represented on the basis of the conventional tire/wheel assembly 1 as standard. The smaller the value, the lower the road noise, and noise characteristics are better.

TABLE 1

|  | Conventional Assembly 1 | Present Invention Assembly 1 | Present Invention Assembly 2 |
|---|---|---|---|
| Road Noise | Standard | −1.1 dB | −1.3 dB |

As can be seen from Table 1, the tire/wheel assemblies of the present invention can reduce road noise due to resonance of the air in the cavity of the pneumatic tire.

EXAMPLE 2

Prepared were tire/wheel assemblies according to the present invention tire/wheel assemblies 3 to 5 (present invention assemblies 3 to 5), comparison tire/wheel assemblies 1 and 2 (comparison assemblies 1 and 2) and conventional tire/wheel assembly 2 (conventional assembly 2), having the same sized tire and the same sized rim as in Example 1, the present invention tire/wheel assemblies 3 to 5 and comparison tire/wheel assemblies 1 and 2 each having a construction shown in FIG. 4 in which the difference between the maximum total opening area and minimum total opening area of openings in four equally sectioned regions of the annular shell was arranged as shown in Table 2, the conventional tire/wheel assembly 2 having an annular shell with no openings.

The present invention tire/wheel assemblies 3 to 5 and comparison tire/wheel assemblies 1 and 2 had the same entire opening area of all the openings that was 0.5% with respect to the outer surface area of the annular shell.

The test tire/wheel assemblies were mounted on a passenger car of 2.5 liter displacement with the air pressure thereof being 200 kPa. Evaluation testing for road noise was conducted in the method shown in Example 1, and evaluation testing for ride comfort was conducted in the following method. The results shown in Table 2 were obtained.

Ride Comfort

Feeling testing was conducted by a test driver in a dry road test course, and the testing results were evaluated by 5 levels. The greater the value, the better the ride comfort.

TABLE 2

|  | Difference (%) | Road Noise | Ride Comfort |
|---|---|---|---|
| Conventional Assembly 2 | — | Standard | 3 |
| Comparison Assembly 1 | 3 | −0.1 dB | 3 |
| Present Invention Assembly 3 | 5 | −0.9 dB | 3 |
| Present Invention Assembly 4 | 7 | −1.1 dB | 3 |
| Present Invention Assembly 5 | 10 | −1.2 dB | 3 |
| Comparison Assembly 2 | 15 | −1.2 dB | 2.5 |

As can be seen from Table 2, the tire/wheel assemblies of the present invention can effectively reduce road noise while maintaining ride comfort.

INDUSTRIAL APPLICABILITY

The tire/wheel assembly of the present invention having the aforementioned excellent effects can be very effectively utilized as a tire/wheel assembly which is to be mounted on a vehicle and allows for run-flat traveling.

What is claimed is:

1. A tire/wheel assembly comprising:
    a wheel having a rim;
    a pneumatic tire mounted on the rim of the wheel, the pneumatic tire having a cavity; and
    a run-flat support member disposed in the cavity of the pneumatic tire, the run-flat support member having an annular shell and elastic rings, the annular shell comprising a support surface located radially outward and two leg portions formed radially inward in a straddling state, the elastic rings supporting the leg portions on the rim,
    wherein the annular shell is configured such that an annular cavity portion surrounded by the run-flat support member and the pneumatic tire has a cross-sectional area that varies in a circumferential direction of the assembly due to changes in the shape of the annular shell in the circumferential direction in a non-running condition.

2. A tire/wheel assembly according to claim 1, wherein the cross-sectional area of the annular cavity portion varies in such a manner that a maximum cross-sectional area thereof is 2% greater or more than a minimum cross-sectional area thereof.

3. A tire/wheel assembly according to claim 1, wherein the cross-sectional area of the annular cavity portion varies periodically.

4. A tire/wheel assembly according to claim 1, wherein the leg portions of the annular shell have a cross-sectional shape which varies in the tire circumferential direction.

5. A tire/wheel assembly according to claim 1, wherein the annular shell has support surfaces connected via a connection section, the connection section having a cross-sectional shape which varies in the tire circumferential direction.

6. A tire/wheel assembly according to claim 1, wherein the annular shell is formed by joining a plurality of shell pieces into which the annular shell is divided in a circumferential direction of the shell.

7. A run-flat support member which is to be disposed in a cavity of a pneumatic tire mounted on a rim of a wheel, comprising:
    an annular shell having a support surface located radially outward and two leg portions formed radially inward in a straddling state; and
    elastic rings supporting the leg portions on the rim,
    wherein the annular shell is configured such that, when the run-flat support member is disposed in the tire cavity in a non-running condition, an annular cavity portion surrounded by the run-flat support member and the pneumatic tire has a cross-sectional area that varies in a circumferential direction of the member due to changes in the shape of the annular shell in the circumferential direction.

8. A run-flat support member according to claim 7, wherein the cross-sectional area of the annular cavity portion varies in such a manner that a maximum cross-sectional area thereof is 2% greater or more than a minimum cross-sectional area thereof.

9. A run-flat support member according to claim 7, wherein the cross-sectional area of the annular cavity portion varies periodically.

* * * * *